(12) United States Patent
Huynh-Ba

(10) Patent No.: US 6,472,493 B1
(45) Date of Patent: Oct. 29, 2002

(54) CLEAR COATING COMPOSITION HAVING IMPROVED EARLY HARDNESS AND WATER RESISTANCE

(75) Inventor: Gia Huynh-Ba, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/447,473

(22) Filed: Nov. 23, 1999

(51) Int. Cl.[7] .................. C09D 175/06; C08L 75/06; C08G 18/18; C08G 18/24; C08G 18/79

(52) U.S. Cl. .................. 528/49; 525/123; 525/131; 525/440; 528/53; 528/58; 528/67; 528/73; 528/75; 528/80; 528/83; 528/54

(58) Field of Search .................. 525/123, 131, 525/440; 528/49, 53, 58, 67, 73, 75, 80, 83, 54

(56) References Cited

U.S. PATENT DOCUMENTS

| | | | |
|---|---|---|---|
| 3,919,173 A | 11/1975 | Coyner et al. | 528/55 |
| 4,038,239 A | 7/1977 | Coyner et al. | 524/872 |
| 4,162,274 A | 7/1979 | Rosenkranz | 528/75 |
| 4,184,031 A * | 1/1980 | Graham et al. | 528/55 |
| 4,275,171 A | 6/1981 | Wegner | 521/107 |
| 4,292,214 A | 9/1981 | Blount | 523/400 |
| 4,332,927 A | 6/1982 | Simone | 528/58 |
| 4,339,592 A | 7/1982 | Becker et al. | 560/25 |
| 4,396,753 A | 8/1983 | Holubka | 528/45 |
| 4,409,381 A | 10/1983 | Holubka | 528/45 |
| 4,442,146 A | 4/1984 | Holubka | 427/386 |
| 4,463,143 A | 7/1984 | Holubka | 525/528 |
| 4,578,426 A | 3/1986 | Lenz et al. | 525/131 |
| 4,772,666 A | 9/1988 | Just et al. | 525/185 |
| 4,880,845 A | 11/1989 | Moss et al. | 521/114 |
| 5,143,994 A | 9/1992 | Laas et al. | 528/45 |
| 5,279,862 A | 1/1994 | Corcoran et al. | 427/407.1 |
| 5,286,782 A | 2/1994 | Lamb et al. | 524/507 |
| 5,354,797 A | 10/1994 | Anderson et al. | 524/285 |
| 5,510,443 A | 4/1996 | Shaffer et al. | 528/45 |
| 5,527,876 A | 6/1996 | Kluth et al. | 528/198 |
| 5,596,044 A | 1/1997 | Gindin et al. | 525/131 |
| 5,770,672 A | 6/1998 | Gitlitz et al. | 528/58 |
| 5,852,203 A | 12/1998 | Jonsson et al. | 548/314.1 |
| 5,856,420 A | 1/1999 | Tucker et al. | 528/53 |
| 5,977,283 A | 11/1999 | Rossitto | 528/44 |

FOREIGN PATENT DOCUMENTS

| | | |
|---|---|---|
| DE | 19544737 C1 | 12/1996 |
| EP | 0 882 750 A2 | 12/1998 |
| EP | 0 885 908 A1 | 12/1998 |
| JP | 01194978 | 8/1989 |
| JP | 04015276 | 1/1992 |
| WO | WO 99/23131 | 11/1998 |

OTHER PUBLICATIONS

Lomolder et al.; Selectivity of Isophorone Diisocyanate in the Urethane Reaction Influence of Temperature, Calalysis, and Reaction Partners; J. Coat. Tech.; 69; No. 868; 51–57; May, 1997.*

Szuiller et al.; Catalysis in Aliphatic Isocyanate–Alcohol Reactions; Modern Paint and Coatings; 28–33; Jun. 1987.*

* cited by examiner

Primary Examiner—Rabon Sergent
(74) Attorney, Agent, or Firm—Steven C. Benjamin

(57) ABSTRACT

A fast hardening clear coating composition for repairing a clearcoat/colorcoat finish of a vehicle, which composition is capable of being wet sanded, buffed or polished to a high gloss finish on the same day of application, comprising a film forming binder and an organic liquid carrier, where the binder contains a hydroxyl component comprising a hydroxyl-containing acrylic polymer and a hydroxyl-terminated polyester oligomer, and an organic polyisocyanate crosslinking component, at least portion of which comprises a trimer of isophorone diisocyanate, where the composition further contains, as a combined curing catalyst, at least one dialkyl tin aliphatic carboxylate, at least one tertiary aliphatic mono or diamine, and at least one aliphatic carboxylic acid, in an effective amount such that the clear coating composition on curing at ambient temperatures is in a water spot free and sufficiently hard state for sanding or buffing within about 4 hours after application or on cool down when baked under normal conditions.

12 Claims, No Drawings

CLEAR COATING COMPOSITION HAVING IMPROVED EARLY HARDNESS AND WATER RESISTANCE

BACKGROUND OF THE INVENTION

This invention relates to solvent based polyurethane coating compositions having a low VOC (volatile organic content) and in particular to a clear coating composition for refinishing clearcoat/colorcoat finishes of vehicles such as automobiles or trucks.

Clearcoat/colorcoat finishes for automobiles and trucks have been used in recent years and are very popular. Nowadays, such finishes are produced by a wet-on-wet method, in which the colorcoat or basecoat which is pigmented is applied and dried for a short period of time but not cured and then the clearcoat, which provides protection for the colorcoat and improves the appearance of the overall finish such as gloss and distinctness of image, is applied thereover and both are cured together.

Repair of such clearcoat/colorcoat finishes that have been damaged, e.g., in a collision, has been difficult in that the low VOC clearcoat refinish compositions in current use, for example, as taught in Corcoran et al. U.S. Pat. No. 5,279,862, issued Jan. 18, 1994, Lamb et al. U.S. Pat. No. 5,286,782, issued Feb. 15, 1994, and Anderson et al. U.S. Pat. No. 5,354,797, issued Oct. 11, 1994, have short dust drying times but nonetheless take many hours to cure to a sufficiently hard and water resistant state at ambient or slightly elevated temperatures suitable for automotive refinishing, and the vehicle cannot be moved outside to free up work space in the autobody repair shop without risk of water spotting nor can the clearcoat be sanded (wet or dry) or buffed to a high gloss finish on the same day of application. In a typical refinish operation, after the colorcoat is applied, the clearcoat is then applied to the vehicle and the resulting finish is allowed to dry to at least a dust free state before the vehicle is moved out of the paint booth so that another vehicle can be painted. Before any further work can be done to the finish or before the vehicle can be stored outside to free up additional floor space, not only must the finish be dust free so that dust and dirt will not stick to the finish, it must also be sufficiently hard to sand or buff to improve the gloss or to remove minor imperfections as well as water resistant. Conventional finishes are unable to cure to a sufficiently hard and water resistant state in a relatively short period of time, and thus the productivity of a refinish operation is still lacking, since the vehicles cannot be stored outside or worked on quickly after application of the finish.

One approach used to improve the initial hardness and water resistance of a clearcoat composition on curing involves replacing a portion of the conventional polyisocyanate crosslinking agent (like hexamethylene diisocyanate (HDI) trimer) with a relatively hard or rigid material, such as isophorone diisocyanate (IPDI) trimer. Unfortunately, IPDI has a much slower curing rate than that of HDI. Consequently, these coatings must rely on significantly high baking temperatures and/or high levels of conventional tin catalysts to achieve the hardness offered by the IPDI trimer in addition to water resistance in a relatively short period of time. However, in the automotive refinishing industry, high baking temperatures are undesirable, as they will permanently damage a vehicle's upholstery, wiring, stereo, plastic bumpers, etc. High tin catalyst levels, on the other hand, produce certain unwanted side effects such as reduced pot life and increased "die-back". Die-back mainly occurs as the film is formed before all solvents are evaporated. The solvents that are trapped create a stress on the film as they eventually flash away, which distorts or wrinkles the film and converts it almost overnight from an attractive high gloss mirror-like finish into a dull fuzzy appearance having poor gloss and distinctness of image.

Thus, a continuing need still exists for a low VOC coating composition suited for use as a clearcoat in automotive refinishing that offers high film hardness and water resistance in a very short period of time when cured at ambient or slightly elevated temperatures, with little or no pot life reductions and die-back consequences, so that a vehicle can be moved or worked on quickly after application.

SUMMARY OF THE INVENTION

The invention provides a low VOC solvent based polyurethane coating composition having improved early hardness and water resistance, containing a film forming binder and a volatile organic liquid carrier for the binder, wherein the binder contains (A) a hydroxyl component comprising at least one hydroxyl-containing acrylic polymer and at least one hydroxyl-terminated polyester oligomer; and (B) a polyisocyanate component, at least a portion of which comprises a trimer of isophorone diisocyanate; wherein the ratio of equivalents of isocyanate per equivalent of hydroxyl groups in the binder is about 0.5/1 to 3.0/1;

wherein the composition further contains (C) a catalyst system for the binder comprising at least one ogranotin compound, at least one tertiary amine, and at least one organic acid;

wherein the coating composition on curing at ambient temperatures is in a water spot free and sand or buff state within 4 hours after application and has a Persoz hardness of at least 35 counts, while at the same time exhibits little or no pot life reductions and little or no die-back in the attractive high gloss finish formed therefrom.

The present invention also provides an improved process for repairing a clearcoat/colorcoat finish of a vehicle using the aforesaid coating composition as a refinish clearcoat, which process allows the vehicle to be moved outside and the finish to be sanded (wet or dry), buffed or polished, if necessary, to remove minor imperfections and enhance gloss within a short period of time after application, which greatly improves the efficiency of a refinish operation by allowing more vehicles to be processed in the same or in less time.

DETAILED DESCRIPTION OF THE INVENTION

The coating composition of this invention is a low VOC composition that is particularly suited for use as a clearcoat in automotive refinishing. The composition contains a film forming binder and an organic liquid carrier which is usually a solvent for the binder. Since the invention is directed to a low VOC composition, the amount of organic solvent used in the liquid carrier portion results in the composition having a VOC content of less than 0.6 kilograms per liter (5 pounds per gallon) and preferably in the range of about 0.25–0.53 kilograms (2.1–4.4 pounds per gallon) of organic solvent per liter of the composition, as determined under the procedure provided in ASTM D-3960. This usually translates to a film forming binder content of about 25–90% by weight and an organic liquid carrier content of about 10–75% by weight, preferably about 35–55% by weight binder and 45–65% by weight carrier.

The binder contains two components, a hydroxyl and an organic polyisocyanate crosslinking component, which are capable of reacting with each other to form urethane linkages. In the present invention, the hydroxyl component contains about 50–99% by weight of a hydroxyl functional acrylic polymer or a blend of such polymers and about 1–50% by weight of a hydroxyl-terminated polyester oligomer or blend of such oligomers. The total percentage of hydroxyl-containing materials in the hydroxyl component is herein considered to equal 100%. The polyisocyanate component, on the other hand, contains about 3–50% by weight of a trimer of isophorone diisocyanate and about 50–97% by weight of a second organic polyisocyanate or blend of such polyisocyanates, with the second polyisocyanate preferably being a timer of hexamethylene diisocyanate. The total percentage of polyisocyanates in the crosslinking component is herein considered to equal 100%. The hydroxyl and polyisocyanate components are generally.employed in an equivalent ratio of isocyanate groups to hydroxyl groups of about 0.5/1 to 3.0/1, preferably in the range of about 0.8/1 to 1.5/1.

The hydroxyl functional acrylic polymer used in the hydroxyl component of the binder is prepared by conventional solution polymerization techniques in which monomers, solvents and polymerization catalyst are charged into a conventional polymerization reactor and heated to about 60–200° C. for about 0.5–6 hours to form a polymer having a weight average molecular weight (Mw) of about 2,000–13,000, preferably about 3,000–11,000.

All molecular weights disclosed herein are determined by GPC (gel permeation chromatography) using polymethyl methacrylate standard, unless otherwise noted.

The acrylic polymer thus formed also has a glass transition temperature (Tg) generally of at least 30° C. and preferably about 40–80° C.

All glass transition temperatures disclosed herein are determined by DSC (differential scanning calorimetry).

Typically useful polymerization catalysts are azo type catalysts such as azo-bis-isobutyronitrile, 1,1'-azo-bis (cyanocylohexane), acetates such as t-butyl peracetate, peroxides such as di-t-butyl peroxide, benzoates such as t-butyl perbenzoate, octoates such as t-butyl peroctoate and the like.

Typical solvents that can be used are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, ester, such as butyl acetate, and mixtures of any of the above.

The hydroxyl functional acrylic polymer is preferably composed of polymerized monomers of styrene, a methacrylate which is either methyl methacrylate, isobornyl methacrylate, cyclohexyl methacrylate or a mixture of these monomers, a second methacrylate monomer which is either n-butyl methacrylate, isobutyl methacrylate or ethyl hexyl methacrylate or a mixture of these monomers and a hydroxy alkyl methacrylate or acrylate that has 1–8 carbon atoms in the alkyl group such as hydroxy ethyl methacrylate, hydroxy propyl methacrylate, hydroxy butyl methacrylate, hydroxy ethyl acrylate, hydroxy propyl acrylate, hydroxy butyl acrylate and the like.

One preferred acrylic polymer contains about 5–30% by weight styrene, 1–50% by weight of the methacrylate, 30–60% by weight of the second methacrylate and 10–40% by weight of the hydroxy alkyl methacrylate. The total percentage of monomers in the polymer equal 100%.

One particularly preferred acrylic polymer contains the following constituents in the above percentage ranges: styrene, methyl methacrylate, isobutyl methacrylate and hydroxy ethyl methacrylate.

Another particularly preferred acrylic polymer contains the following constituents in the above percentage ranges: styrene, isobornyl methacrylate, ethyl hexyl methacrylate, hydroxy ethyl methacrylate and hydroxy propyl methacrylate.

Another particularly preferred acrylic contains the following constituents in the above percentages: styrene, methyl methacrylate, isobornyl methacrylate, ethyl hexyl methacrylate, isobutyl methacrylate, and hydroxy ethyl methacrylate. Most preferably, compatible blends of two of the above acrylic polymers are used.

Optionally, the acrylic polymer can contain about 0.5–2% by weight of acrylamide or methacrylamide such as n-tertiary butyl acrylamide or methacrylamide.

The hydroxyl component of the binder further contains a hydroxyl terminated polyester oligomer having a weight average molecular weight (Mw) not exceeding about 3,000, preferably about 200–2,000, and a polydispersity of less than about 1.7.

Typically useful oligomers include caprolactone oligomers containing terminal hydroxyl groups which may be prepared by initiating the polymerization of caprolactone with a cyclic polyol, particularly a cycloaliphatic polyol, in the presence of a tin catalysts via conventional solution polymerization techniques. Such caprolactone oligomers are well known and described at length in Anderson et al. U.S. Pat. No. 5,354,797, issued Oct. 11, 1994, hereby incorporated by reference. Epsilon(c)-caprolactone is typically employed as the caprolactone component in a 1/1 to 5/1 molar ratio with a cycloaliphatic diol. Typically useful cycloaliphatic polyol monomers include 1,4-cyclohexanediol, 1,4-cyclohexane dimethanol, and 2,2'-bis (4-hydroxycyclohexyl) propane. Preferred caprolactone oligomers are formed from -caprolactone and 1,4-cyclohexanedimethanol reacted in a molar ratio of 2/1 to 3/1.

Other useful oligomers include alkylene oxide polyester oligomers containing terminal hydroxyl groups which may be made by reacting stoichiometric amounts of a cycloaliphatic monomeric anhydride with a linear or branched polyol in solution at elevated temperatures in the presence of a tin catalyst using standard techniques and then capping the acid oligomers so formed with monofunctional epoxies, particularly alkylene oxide, under pressure above atmospheric but not exceeding about 200 psi and at temperatures of 60–200° C. for 1 to 24 hours. Such alkylene oxide oligomers are well known and described at length in Barsotti et al. PCT Application No. US98/23337, published May 14, 1999, hereby incorporated by reference.

Cycloaliphatic anhydride monomers such as hexahydrophthalic anhydride and methyl hexahydrophthalic anhydride are typically employed in the alkylene oxide oligomers above. Aliphatic or aromatic anhydrides, such as succinic anhydride or phthalic anhydride may also be used in conjunction with the anhydrides described above. Typically useful linear or branched polyols include, hexanediol, 1,4-cyclohexane dimethanol, trimethylol propane, and pentaerythritol. Useful monofunctional epoxies include alkylene oxides of 2 to 12 carbon atoms. Ethylene, propylene and butylene oxides are preferred although ethylene oxide is most preferred. Other epoxies, such as. "Cardura" E-5 or "Cardura" E-10 glycidyl ether, supplied by Exxon Chemicals, may be used in conjunction with the monofunctional epoxies described above. Particularly preferred alkylene oxide oligomers are formed from methyl hexahydrophthalic anhydride; either 1,4-cyclohexanedimethanol, trimethylol propane, or pentaerythritol; and ethylene oxide reacted in stoichiometric amounts.

Compatible blends of any of the aforementioned oligomers can be used as well in the hydroxyl component of the binder.

The polyisocyanate component of the binder includes an organic polyisocyanate crosslinking agent or a blend thereof, at least a portion of which comprises a trimer of isophorone diisocyanate (IPDI). By "trimer", it is meant that the isocyanate groups have been trimerized to form isocyanurate groups. Typically useful IPDI trimers are sold under the tradenames "Desmodur" Z-4470 BA or SN/BA or SN or MPA/X. As mentioned above, the IPDI trimer offers the resulting coating improved hardness on curing.

In the present invention, the polyisocyanate component preferably contains at least 3% up to about 50% by weight, more preferably about 15–35% by weight, of the IPDI trimer. Although a lesser amount of IPDI trimer can be used, it has been found that below about 3% by weight, the desired hardness cannot be achieved in under 4 hours at ambient temperatures. Above 50%, the composition tends to become too brittle and will crack over time.

Any of the conventional aromatic, aliphatic, cycloaliphatic diisocyanates, trifunctional isocyanates and isocyanate functional adducts of a polyol and a diisocyanate may be used in conjunction with the IPDI trimer in the polyisocyanate component.

Typically useful diisocyanates are 1,6-hexamethylene diisocyanate, sophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-pheneylene diisocyanate, 1,5-naphthalene diisocyanate, bis (4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of other diisocyanates also can be used such as the trimer of hexamethylene diisocyanate (HDI) which is sold under the tradename "Desmodur" N-3300 or N-3390 or "Tolonate" HDT or HDT-LV.

Isocyanate functional adducts can also be used that are formed from an organic polyisocyanate and a polyol. Any of the aforementioned polyisocyanates can be used with a polyol to form an adduct. Polyols such as trimethylol alkanes like trimethylol propane or ethane can be used. One useful adduct is the reaction product of tetramethylxylidene diisocyanate and trimethylol propane and is sold under the tradename "Cythane" 3160.

One particularly preferred polyisocyanate crosslinking component comprises a mixture of about 15–35% by weight IPDI trimer and about 65–85% by weight HDI trimer. It is generally preferred to employ an HDI trimer in combination with the IPDI trimer to retain flexibility in the coating film.

The coating composition also contains a sufficient amount of catalysts to cure the composition at ambient temperatures. It has been found in the present invention that a combination of certain catalysts in certain specified amounts can effectively accelerate the curing rate of IPDI trimer at room temperature to achieve the high film hardness offered by IPDI in a relatively short period of time, surprisingly with little or no pot life reductions or die-back in the coating film formed therefrom. Therefore, even at these accelerated curing rates, the coating compositions remains processable for at least 30 minutes at ambient temperatures which provides enough time to complete the refinish job without the need for viscosity adjustments, and the high gloss coating film formed therefrom shows virtually no signs of dying back to a dull fuzzy finish over time.

Specifically, the combined curing catalyst system used in the present invention comprises at least one organotin tin compound, at least one tertiary amine, and at least one organic acid in certain specified amounts.

Typically useful organotin compounds include organotin carboxylates, particularly dialkyl tin carboxylates of aliphatic carboxylic acids, such as dibutyl tin dilaurate (DBTDL), dibutyl tin dioctoate, dibutyl tin diacetate, and the like. Although not preferred, any of the other customary organotin or organometallic (Zn, Cd, Pb) catalysts could also be used. The amount of organotin catalyst employed in the coating composition can vary considerably depending on the specific binder system and the degree of initial hardness desired. However, it is critical that the coating composition contains enough organotin catalyst to cure the composition at ambient temperatures, while at the same time being insufficient to cause die-back.

Generally, about 0.005–0.2% by weight, based on the weight of the binder, of organotin catalyst will be sufficient to impart the desired properties. It has been found that above the upper limit of 0.2%, the curing reaction is too fast and die-back results. Below about 0.005%, the curing reaction is too slow and insufficient hardness and poor mechanical properties develop.

Typically useful tertiary amines or co-catalyst include tertiary aliphatic monoamines or diamines, particularly trialkylene diamines, such as triethylene diamine (DABCO), N-alkyl trimethylenediamine, such as N,N,N'-trimethyl-N'-tallow-1,3-diainopropane, and the like; and trialkylamines such as tridodecylamine, trihexadecylamine, N,N'-dimethylalkyl amine, such as N, N'-dimethyldodecyl amine, and the like. The alkyl or alkylene portions of these amines may be linear or branched and may contain 1–20 carbon atoms. Especially preferred are amines that contain at least 6 carbon atoms in at least one of their alkyl or alkylene portions to lower the hazing in humid conditions.

As with the amount of organotin compound, the amount of tertiary amine employed in the coating composition can vary considerably, it being required only that tertiary amine be present in an amount which, together with the above, will cause the composition to cure at ambient temperatures in under 4 hours. Generally, about 0.01–1% by weight, based on the weight of the binder, of tertiary amine will be sufficient to impart the desired properties. Above the upper limit of about 1%, the tertiary amine offers longer dust drying times and provides the film with insufficient hardness. Below about 0.01%, the catalytic effect is inadequate.

An organic acid is also included in the catalyst system for increased pot life. A pot life of at least 30 minutes at ambient temperatures is generally sufficient for completion of a refinish job. Typically useful acid catalysts are formic acid, acetic acid, proponic acid, butanoic acid, hexanoic acid, and any other aliphatic carboxylic acid, and the like. Generally, about 0.005–1%, based on the weight of the binder, of acid catalyst is employed.

It has been found that the catalyst package described above offers a higher cure response than tin, amine, or acid alone.

To improve weatherability of the composition about 0.1–10% by weight, based on the weight of the binder, of ultraviolet light stabilizers screeners, quenchers and antioxidants can be added. Typical ultraviolet light screeners and stabilizers include the following:

Benzophenones such as hydroxy dodecyloxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxyphenyl derivatives of triazine, sulfur containing derivatives of dialkyl-4-hydroxy phenyl triazine, hydroxy phenyl-1,3,5-triazine and the like.

Triazoles such as 2-phenyl-4-(2,2'-dihydroxy benzoyl)-triazole, substituted benzotriazoles such as hydroxyphenyltriazole and the like.

Hindered amines such as bis(1,2,2,6,6 entamethyl-4-piperidinyl sebacate), di[4(2,2,6,6,tetramethyl piperidinyl)] sebacate and the like and any mixtures of any of the above.

Generally, flow control agents are used in the composition in amounts of about 0.1–5% by weight, based on the weight of the binder, such as polyacrylic acid, polyalkylacrylates, polyether modified dimethyl polysiloxane copolymer and polyester modified polydimethyl siloxane.

When used as a clear coating, it may be desirable to use pigments in the clear coating composition which have the same refractive index as the dried coating. Typically, useful pigments have a particle size of about 0.015–50 microns and are used in a pigment to binder weight ratio of about 1:100 to 10:100 and are inorganic siliceous pigments such as silica pigment having a refractive index of about 1.4–1.6.

The coating composition of the present invention also contains the customary organic solvents in the organic liquid carrier portion. As previously described, the amount of organic solvent(s) added depends upon the desired binder level as well as the desired amount of VOC of the composition. Typical organic solvents consist of aromatic hydrocarbons, such as petroleum naphtha or xylenes; ketones, such as methyl amyl ketone, methyl isobutyl ketone, methyl ethyl ketone, or acetone; esters, such as butyl acetate or hexyl acetate; and glycol ether esters, such as propylene glycol monomethyl ether acetate. Examples of solvents which do not contribute to the VOC of the composition include acetone, 1-chloro, 4-trifluoromethyl benzene, and potentially t-butyl acetate.

The coating composition of this invention is preferably prepared as a "two-component" or "two-pack" coating composition, wherein the two reactive binder components are stored in separate containers, which are typically sealed. The catalyst, organic solvent, and usual other additives may be added to either or both the hydroxyl or crosslinking components, depending upon the intended use of the composition. However, these additives (except for some solvent) are preferably added to and stored in the same container with the hydroxyl component. The contents of the hydroxyl and isocyanate component containers are mixed in the desired NCO/OH ratio just prior to use to form the activated coating composition, which has a limited pot life. Mixing is usually accomplished simply by stirring at room temperature just before application. The coating composition is then applied as a layer of desired thickness on a substrate surface, such as an autobody. After application, the layer dries and cures to form a coating on the substrate surface having the desired coating properties.

Generally, the coating composition of this invention is used as a clearcoat in automotive refinishing, but it should be understood that it can also be used as a clearcoat finish or can be pigmented with conventional pigments and used as a monocoat or as a basecoat in a clearcoat/colorcoat finish or refinish.

In the application of the coating composition as a clearcoat refinish to a vehicle such as an automotive or a truck, the basecoat which may be either a solvent based composition or a waterborne composition is first applied and then dried to at least remove solvent or water before the clearcoat is applied usually wet-on-wet by conventional spraying. Electrostatic spraying also may be used. In refinish applications, the composition is preferably dried and cured at ambient temperatures but can be forced dried and cured in paint booths equipped with heat sources at slightly elevated booth temperatures of, in general, about 30–100° C., preferably about 35–65° C., for a short time of about 3–30 minutes, preferably about 5–15 minutes. The coating so formed is typically about 0.5–5 mils thick.

In these refinish applications, in particular, the clearcoat of this invention has been found to greatly improve the productivity of a refinish operation. Through incorporation of a mixture of polyacrylic resin, polyester oligomers, IPDI trimer, and certain catalysts the composition when used as a clearcoat dries and cures in a relatively short time after application to a dust free, water resistant, and sufficiently hard state for sanding (wet or dry) or buffing, unexpectedly with minimum pot life reductions and die-back consequences, which allows the vehicle to be buffed, moved out of the way, and delivered to the customer on the same day of application, in comparison to the next day offered by conventional. The composition of this invention, in particular, exhibits a pot life of at least 30 minutes at ambient temperature, dust free time within 20 minutes at ambient temperatures, and water spot free and sand or buff time within 4 hours at ambient temperatures or within 1–2 hours when near the high end of the organotin catalyst range. The foregoing properties can be achieved much faster by curing the composition at slightly elevated temperatures of, in general, about 55–65° C. peak substrate temperature for about 3–10 minutes, and preferably about 60° C. for about 6 minutes, which remarkably allows the clear finish to be sanded or buffed immediately on cool down. Furthermore, the finish remains sandable or buffable for several days up to one week before it cures to a tough, hard durable exterior automotive finish.

The coating composition of this invention can be used to paint or repair a variety of substrates such as previously painted metal substrates, cold roll steel, steel coated with conventional primers such as electrodeposition primers, alkyd resin repair primers and the like, plastic type substrates such as polyester reinforced fiber glass, reaction injection molded urethanes and partially crystalline polyamides, as well as wood and aluminum substrates.

The following examples illustrate the invention. All parts and percentages are on a weight basis unless otherwise indicated. All molecular weights are determined by GPC using a polymethyl methacrylate standard.

EXAMPLES

Test Procedures

The following test methods were used to evaluate the coatings:

The dust free drying time was determined by wiping a cotton ball against the freshly painted panel. Once the hair of the cotton ball no longer sticks to the paint, this is the dust free time.

The buffing time was determined by sanding, buffing or polishing the film. Once the coating no longer sticks (gums up) on the sanding paper or buffing pad, this is time the coating is ready to be sanded, buffed or polished.

The film hardness is another indication of when the coating film is ready to be sanded, buffed or polished. The coating film alone must have a Persoz hardness of at least 35 counts, preferably in the range of about 40–150 counts, at a film thickness of 2.2 mils when measured on a previously uncoated cold rolled steel (Q) panel before it can be sanded, buffed or polished. Persoz hardness is determined by a GARDCO® Pendulum Hardness Tester Model HA-5854 manufactured by BYK Chemie, Germany and sold by Paul N. Gardness Company, Inc. Pompano Beach, Fla.

The coating must also be water spot free before it is ready to be wet sanded or stored in the rain. If water spot damage is formed on the film, this is an indication that the cure is not complete and further curing is needed before the film can be wet sanded or exposed to rainy weather conditions. The water spot free time was determined by putting a water drop on the refinish film for every ½ hour and up to 24 hours. The water will damage the film if it is not cured. As a consequence, the water drop will form a damage ring on the refinish panel. The degree of damage is rate from 1 to 10 scale. A score of 10 indicates no damage while 1 indicates severe water spotting.

The pot life was determined by measuring the solution viscosity with a Zahn #2 cup at ambient temperature every hour. The initial solution viscosity should be about 14–19 sec. When the viscosity exhibits a 20% increase over its initial value; it is an indication that the composition is no longer sprayable through conventional spray equipment. The time it takes a coating to reach this viscosity determines its pot life.

The die-back was determined visually by one skilled in the art. One skilled in the art compares the initial gloss and DOI (distinctness of image) of the coating film with the gloss and DOI after the film is allowed to dry overnight. If there is a significant drop in the gloss and DOI levels, such that the coating film has a dull fuzzy appearance, die-back is said to result.

Example 1

In this example, a comparison is made between a clearcoat of this invention and a commercially available clearcoat.

Acrylic Polymer 1

A hydroxyl-containing acrylic polymer solution was prepared by charging the following constituents into a reactor equipped with a thermocouple, a heating mantle, a mechanical stirrer, addition funnel, nitrogen purge, and a reflux condenser:

|  | Parts By Weight |
| --- | --- |
| Portion 1 | |
| Xylene | 56 |
| Portion 2 | |
| Methyl ethyl ketone | 10 |
| Styrene monomer | 15 |
| Isobutyl methacrylate monomer | 22 |
| Isobornyl methacrylate monomer | 15 |
| Ethyl hexyl methacrylate monomer | 23 |
| Hydroxy ethyl methacrylate monomer | 25 |

-continued

|  | Parts By Weight |
| --- | --- |
| Portion 3 | |
| T-butyl peracetate solution (75% solids in mineral spirits) | 4.7 |
| Total | 170.7 |

Portion 1 was added to the reactor and heated to its reflux temperature. Portions 2 and 3 were then added together at a uniform rate to the reactor over a three hour period while the resulting reaction mixture was maintained at its reflux temperature. The reaction mixture was held at reflux for an additional hour. The resulting acrylic polymer solution had a polymer solids content of about 60%. The polymer had a weight average molecular weight (Mw) of about 6,500 and a glass transition temperature (Tg) of about 40° C.

Caprolactone Oligomer

A caprolactone oligomer was prepared by reacting-caprolactone monomer and 1,4-cyclohexanedimethanol in a 3/1 molar ratio. A 5-liter round bottom flask was fitted with a thermocouple, a heating source, a mechanical stirrer, and a reflux condenser. The following ingredients were charged to the reaction flask:

| Ingredients | Parts by Weight |
| --- | --- |
| 1,4-cyclohexanedimethanol | 29.6 |
| Tone ® EC HP (caprolactone) | 70.3 |
| 10% of solution of dibutyl tin dilaurate in xylene | 0.1 |
| Total | 100 |

Portion 1 was heated to 140° C. and held at 135–140° C. for 4 hours. Gas chromatography showed that all the caprolactone had been consumed. The oligomer had a Mw of about 486, a Tg of about -70° C., and a polydispersity (Pd) of about 1.1.

Clear Coating Composition

A clear coating composition was prepared by forming components 1 and 2 described below and then mixing these components together.

The following ingredients were blended together to form component 1 which is the hydroxyl component:

| Component 1 | Parts by Weight |
| --- | --- |
| Acrylic polymer 1 solution (prepared above) | 62.4 |
| Caprolactone oligomer 1 solution (prepared above) | 1.36 |
| Triethylene diamine | 0.25 |
| Tinuvin ® 292 ((1,2,2,6,6-pentamethyl-4-piperidenyl)-sebacate) | 0.76 |
| Tinuvin ® 328 (2-(2-hydroxy-3,5-ditertiary amyl phenyl)-2H-benzotriazole) | 0.76 |
| Byk ® 325 (polysiloxane polyether copolymer) | 0.05 |
| Dibutyl tin dilurate | 0.01 |
| Butyl acetate | 9.1 |
| Toluene | 2.4 |
| Methyl ethyl ketone | 4.1 |
| Xylene | 7.7 |
| Acetic acid | 0.13 |
| Methyl isobutyl ketone | 11.0 |
| Total | 100 |

The following ingredients were blended together to form component 2 which is the isocyanate activator solution:

| Component 2 | Parts by Weight |
|---|---|
| Desmodur ® N-3300 (100% solids 1,6-hexamethylene diisocyanate trimer) | 40.6 |
| Desmodur ® Z-4470 BA (70% solids isophorone diisocyanate trimer in butyl acetate) | 24.8 |
| Butyl acetate | 34.6 |
| Total | 100 |

Components 1 and 2 were mixed together in a 66.5/33.5 weight ratio to form a clear coating composition according to this invention.

The resulting composition had a VOC content of 4.4 lbs/gal, a binder solids content of 46% and a binder of acrylic polymer 1/caprolactone oligomer//IPDI trimer/HDI trimer weight ratio of 96.5/3.5/130/70 and NCO/OH (isocyanate group to hydroxyl group) equivalent ratio of 1.08.

A conventional commercially available fast drying refinish clearcoat composition was prepared. The composition contained a commercial acrylic polymer combined with tin catalyst that was activated with an isocyanate activator based on IPDI trimer/HDI trimer (50/50) and a mid-temperature reducer solvent was added to provide the correct spray viscosity and spray solids.

Each of the above compositions was sprayed (1) onto an uncoated cold rolled steel or Q panel and cured under the same conditions for hardness and dust free time determinations and (2) onto a cold rolled steel surface previously coated with a primer and a colorcoat and cured under the same conditions for water spot, buffability and die back measurements.

The following is a comparison of important properties of the composition of this invention and the conventional refinish composition:

| Properties | Invention | Conventional |
|---|---|---|
| IPDI trimer (%) | 30 | 50 |
| Ambient air dry (25° C./50% RH) | | |
| Dust free time | 10 min | 30 min |
| Time to buff | 4 hours (same day) | 8 hours (next day) |
| Water spot free | | |
| After 1 hr | 8 | 6 |
| After 3 hr | 9 | 7 |
| After 4 hr | 10 | 7 |
| Die-back | | |
| Yes or No | No | Yes |
| Persoz hardness at 2.2 mil (sec) | | |
| After 4 hr | 88 | 36 |
| Next day | 210 | 93 |
| Pot life at Ambient | >2 hr | 1 hr |
| Wet sand after baking at 60° C. metal temperature for 5 minutes | | |
| Yes or No | Yes | No |

From the above results, it can be seen that even though the commercial composition uses IPDI trimer, it still did not achieve the desired early hardness, water spot resistance, and quick (same day) buffabilty offered by the composition of the present invention. In addition, the pot life was much shorter and die-back resulted due to the large amount of tin catalyst employed. The composition according to the invention clearly shows that a combination of certain acrylic polymers, polyester oligomers, IPDI trimer, HDI trimer, and a certain catalyst package gives a much improved clearcoat that increases the productivity of a refinish operation.

Example 2

Acrylic Polymer 2

A hydroxyl-containing acrylic polymer solution was prepared by the same procedure described in Example 1 with the following ingredients:

| | Parts By Weight |
|---|---|
| Portion 1 | |
| Xylene | 57 |
| Portion 2 | |
| Methyl ethyl ketone | 10 |
| Styrene monomer | 15 |
| Isobutyl methacrylate monomer | 45 |
| Methyl methacrylate monomer | 20 |
| Hydroxy ethyl methacrylate monomer | 20 |
| Portion 3 | |
| T-butyl peracetate solution (75% solids in mineral spirits) | 3.0 |
| Total | 170 |

The resulting acrylic polymer solution had a polymer solids content of about 60%. The polymer had a Mw of about 10,500 and a Tg of about 58° C.

Alkylene Oxide Polyester Oligomer

A tetrahydroxyl-terminated ethylene oxide based polyester oligomer was prepared by charging the following into a reaction vessel rated for high pressure and heated to 140° C.:

| Ingredients | Weight (Grams) |
|---|---|
| Propylene glycol monomethyl ether acetate | 420 |
| Pentaerythritol | 136 |
| Triethylene amine | 0.23 |

To the vessel, 645 grams of methylhexahydrophthalic anhydride was then added over one hour. The batch was then held at 140° C. for 6 hours. The batch was then cooled to 25° C., the pressure vessel was then sealed and 173 grams of ethylene oxide (EO) was added and the batch was heated to 110° C. and held at that temperature for 6 hours. Excess ethylene oxide was removed by purging the batch with nitrogen. The acid number on the solids was tested at less than 10 mg KOH/gram.

The resulting oligomer solution had a 75% solids content. The oligomer had all primary hydroxyl functionalities, a Mw of about 1,000, a Tg of about 0° C., a polydispersity (Pd) of about 1.1.

Clear Coating Composition

A clear coating composition was prepared by forming components 1 and 2 described below by the same procedure described in Example 1 and then mixing these components together.

| Component 1 | Parts by Weight |
|---|---|
| Acrylic polymer 1 solution (from Example 1) | 32.3 |
| Acrylic polymer 2 solution (prepared above) | 25.3 |
| Polyester oligomer solution (prepared above) | 9.15 |
| N,N-dimethyl dodecyl amine | 0.05 |
| Tinuvin ® 292 (described above) | 2.05 |
| Tinuvin ® 328 (described above) | 2.05 |
| Byk ® 325 (described above) | 0.25 |
| Dibutyl tin dilaurate | 0.05 |
| Butyl acetate | 7.96 |
| Methyl ethyl ketone | 5.5 |
| Xylene | 5 |
| Acetic acid | 0.26 |
| Methyl isobutyl ketone | 10 |
| Total | 100 |

| Component 2 | Parts by Weight |
|---|---|
| Desmodur ® N-3300 (described above) | 54 |
| Desmodur ® Z-4470 BA (described above) | 14 |
| Butyl acetate | 32 |
| Total | 100 |

Components 1 and 2 were mixed together in a 75.6/24.4 weight ratio to form a clear coating composition according to this invention. The resulting composition had a VOC content of 4.0, a binder solids content of 50.8% and a binder of acrylic polymer 1/acrylic polymer 2/polyester oligomer//IPDI trimer/HDI trimer weight ratio of 49/34/17//15/85 and NCO/OH equivalent ratio of 1.2. The above compositions was sprayed out and tested in the same manner as described in Example 1.

The following are important properties of the composition of this invention:

| Properties | Invention |
|---|---|
| IPDI trimer (%) | 15 |
| Ambient air dry (25° C./50% RH) | |
| Dust free time | 2–3 min |
| Time to Buff | 4 hr |
| Water spot | |
| 1 Hr | 9.7 |
| 2 Hr | 10 |
| 12 Hr | 10 |
| Die back | No |
| Persoz hardness at 2.2 mil (sec) | |
| After 4 hr | 40 |
| Pot Life at Ambient | 1.5 hr |
| Wet sand after baking at 60° C. metal temperature for 5 minutes | |
| Yes or No | Yes |

The above results show that the composition of the invention was virtually water spot free within 1 hour after drying at ambient temperature, which allows the vehicle to be moved outside earlier without fear of water spotting.

Example 3

Acrylic Polymer 3

A hydroxyl-containing acrylic polymer solution was prepared by the same procedure described in Example 1 with the following ingredients:

| | Parts By Weight |
|---|---|
| Portion 1 | |
| Xylene | 55 |
| Portion 2 | |
| Methyl ethyl ketone | 10 |
| Styrene monomer | 15 |
| Methyl methacrylate monomer | 5 |
| Isobutyl methacrylate monomer | 32 |
| Isobornyl methacrylate monomer | 23 |
| 2-ethyl hexyl methacrylate monomer | 5 |
| Hydroxy ethyl methacrylate monomer | 20 |
| Portion 3 | |
| T-butyl peracetate solution (75% solids in mineral spirits) | 2.5 |
| Total | 167.5 |

The resulting acrylic polymer solution had a polymer solids content of about 60%. The polymer had a Mw of about 8,500 and a Tg of about 55° C.

Clear Coating Composition

A clear coating composition was prepared by forming components 1 and 2 described below by the same procedure described in Example 1 and then mixing these components together.

| Component 1 | Parts by Weight |
|---|---|
| Acrylic polymer 2 solution (from Example 2) | 18.7 |
| Acrylic polymer 3 solution (prepared above) | 20.5 |
| Polyester oligomer solution (from Example 2) | 5.3 |
| N,N-dimethyl dodecyl amine | 0.26 |
| Tinuvin ® 292 (described above) | 0.51 |
| Tinuvin ® 328 (described above) | 0.51 |
| Byk ® 325 (described above) | 0.1 |
| Dibutyl tin dilaurate | 0.02 |
| Butyl acetate | 10.3 |
| Methyl ethyl ketone | 7 |
| Xylene | 3.33 |
| Acetic acid | 0.160 |
| Triethylene diamine | 0.03 |
| Methyl isobutyl ketone | 1.8 |
| Acetone | 2.2 |
| Oxsol ® 100 (1-chloro, 4-trifluoromethyl benzene) | 6.7 |
| Toluene | 2.5 |
| Total | 100 |

| Component 2 | Parts by Weight |
|---|---|
| Desmodur ® N-3300 (described above) | 10.9 |
| Desmodur ® Z-4470 BA (described above) | 2.7 |
| Butyl acetate | 6.5 |
| Total | 20.1 |

Components 1 and 2 were mixed together in a 79.9/20.1 weight ratio to form a clear coating composition according to this invention. The resulting composition had a VOC content of 4.3, a binder solids content of 42% and a binder of acrylic polymer2/acrylic polymer 3/polyester oligomer//IPDI trimer/HDI trimer of 40/44/16//15/85 weight ratio and NCO/OH molar ratio of 1.2. The above composition was sprayed onto a cold roll steel surface coated with a primer and a basecoat and forced dried at 60° C. for 5 minutes for dust free, water spot and buffability measurements.

The coating had the following important properties:

| Properties | Invention |
| --- | --- |
| Bake at 60° C. metal temperature for 5 minutes | |
| Dust free time | On cooling |
| Time to buff | On cooling |
| Water spot on cooling | 10 |

The above results show that after baking at certain reasonable temperatures, the clear coating was dust free, water spot free, and sandable or buffable with no die-back on cool down. None of the conventional compositions in current use can be wet sanded and buffed on cool down.

Example 4

Acrylic Polymer 4

A hydroxyl-containing acrylic polymer solution was prepared by the same procedure described in Example 1 with the following ingredients:

| | Parts By Weight |
| --- | --- |
| Portion 1 | |
| Xylene | 58 |
| Portion 2 | |
| Butyl acetate | 7 |
| Styrene monomer | 20 |
| Isobornyl methacrylate monomer | 30 |
| 2-ethyl hexyl methacrylate monomer | 18 |
| Hydroxy ethyl methacrylate monomer | 16 |
| Hydroxy propyl methacrylate monomer | 16 |
| Portion 3 | |
| T-butyl peracetate solution (75% solids in mineral spirits) | 6.5 |
| Total | 171.5 |

The resulting acrylic polymer solution had a polymer solids content of about 60%, Mw of about 5,000 and a Tg of about 47–48° C.

Clear Coating Composition

A clear coating composition was prepared by forming components 1 and 2 described below by the same procedure described in Example 1 and then mixing the components together.

| Component 1 | Parts by Weight |
| --- | --- |
| Acrylic polymer 4 solution (prepared above) | 33.55 |
| Acrylic polymer 2 solution (from Example 2) | 28 |
| Polyester oligomer solution (from Example 2) | 4.92 |
| N,N-dimethyl dodecyl amine | 0.31 |
| Tinuvin ® 292 (described above) | 0.75 |
| Tinuvin ® 328 (described above) | 0.75 |
| Byk ® 325 (described above) | 0.08 |
| Dibutyl tin dilaurate | 0.05 |
| Butyl acetate | 9.7 |
| Triethylene diamine | 0.04 |
| Methyl ethyl ketone | 10.2 |
| Xylene | 4.9 |
| Acetic acid | 0.46 |
| Methyl isobutyl ketone | 2.64 |
| Toluene | 3.65 |
| Total | 100 |

| Component 2 | Parts by Weight |
| --- | --- |
| Desmodur ® N-3300 (described above) | 51.3 |
| Desmodur ® Z-4470 BA (described above) | 17.9 |
| Butyl acetate | 30.8 |
| Total | 100 |

Components 1 and 2 were mixed together in a 79.9/20.1 weight ratio to form a clear coating composition according to this invention. The resulting composition had a VOC content of 4.28, a binder solids content of 47%, an acrylic polymer 4/acrylic polymer 2/polyester oligomer//IPDI trimer/HDI trimer of 50/40/10//20/80 weight ratio and NCO/OH equivalent ratio of 1.2. The above composition was sprayed out and tested in the same manner as described in Example 1.

The coating had the following important properties:

| Properties | Invention |
| --- | --- |
| IPDI trimer (%) | 20 |
| Ambient air dry (25° C./50% RH) | |
| Dust free time | 2–3 min |
| Time to Buff | 4 hours |
| Water spot | |
| 1 hour | 9.9 |
| 2 hours | 10 |
| 12 hours | 10 |
| Persoz hardness at 2.2 mil (sec) | |
| After 4 hours | 48 |
| Pot Life at Ambient | 1.5 hours |
| Wet sand after baking at 60° C. metal temperators for 5 minutes | |
| Yes or No | Yes |

Various modifications, alterations, additions or substitutions of the components of the compositions of this invention will become apparent to those skilled in the art without departing from the spirit and scope of this invention. This invention is not limited by the illustrative embodiments set forth herein, but rather is defined by the following claims.

What is claimed is:

1. A clear coating composition, containing a film forming binder and a volatile organic liquid carrier for the binder, wherein the binder contains (A) a hydroxyl component comprising at least one hydroxyl-containing acrylic polymer and at least one hydroxyl-terminated polyester oligomer; and (B) an organic polyisocyanate component, at least a portion of which comprises a timer of isophorone diisocyanate;

wherein the ratio of equivalents of isocyanate per equivalent of hydroxy groups in the binder is in the range of about 0.5/1 to 3.0/1;

wherein tie composition further contains (C) a catalyst system for the binder comprising about
(i) 0.005–0.2% by weight, based on the weight of the binder, of at least one organotin compound,
(ii) 0.01–1% by weight, based on the weight of the binder, of at least one tertiary amine, and (iii) 0.005–1%, based on the weight of the binder, of at least one organic carboxylic acid;

wherein the coating composition cures at ambient temperatures to a water spot free and sand and buff state within 4 hours after application.

2. The coating composition of claim 1, wherein the balance of said organic polyisocyanate component is a trimer of hexamethylene diisocyanate.

3. The coating composition of claim 1, wherein the catalyst system comprises a mixture of at least one dialkyl tin dicarboxylate; at least one tertiary amine selected from the group consisting of trialkylene diamines and trialkyl amines, and mixtures thereof; and, at least one aliphatic alkyl carboxylic acid.

4. The coating composition of claim 3, wherein at least one of said tertiary amines in said catalyst system has an alkyl or alkylene portion that contains 6 or more carbon atoms.

5. The coating composition of claim 1, wherein the composition is a two-pack coating comprising in the first pack, components (A) combined with component (C), and in the second pack, component (B), wherein the contents of each pack are mixed together just prior to use.

6. The coating composition of claim 1, wherein the composition is a clear coat for repairing a clearcoat/colorcoat finish.

7. A clear coating composition containing about 25–90% by weight of a film forming binder and about 10–75% by weight of a volatile organic liquid carrier for the binder, wherein the binder contains (A) a hydroxyl component comprising about
 (i) 50–99% by weight, based on the total weight of the hydroxyl component, of a hydroxyl-containing acrylic polymer;
 (ii) 1–50% by weight based on the total weight of the hydroxyl component, of a hydroxyl-terminated polyester oligomer; and (B) an organic polyisocyanate component comprising about
 (i) 3–50% by weight, based on the total weight of the polyisocyanate component, of a trimer of isophorone diisocyanate;
 (ii) 50–97% by weight, based on the total weight of the polyisocyanate component, of a second organic polyisocyanate;

wherein the ratio of equivalents of isocyanate groups per equivalent of hydroxyl groups in the binder is in the range from about 0.5/1 to 3/1;

wherein the composition further contains:
 (C) a catalyst system for the binder comprising about
  (i) 0.005–0.2% by weight, based on the weight of the binder, of an organotin compound,
  (ii) 0.01–1% by weight, based on the weight of the binder, of a tertiary amine; and
  (iii) 0.005–1%, base on the weight of the binder, of an organic carboxylic acid.

8. The coating composition of claim 7, wherein the composition is a clear coat for repairing a clearcoat/colorcoat finish.

9. A clear coating composition containing about 25–90% by weight of a film forming binder and about 10–75% by weight of a volatile organic liquid carrier for the binder and a VOC content of less than about 4.4 lbs/gal, wherein the binder contains (A) a hydroxyl component comprising about
 (i) 50–99% by weight, based on the total weight of the hydroxyl component, of a hydroxyl-containing acrylic polymer formed of polymerized monomers of styrene; a methacrylate selected from the group consisting of methyl methacrylate, isobornyl methacrylate, cyclohexyl methacrylate, and any mixtures thereof; a second methacrylate monomer selected from the group consisting of n-butyl methacrylate, isobutyl methacrylate and ethyl hexyl methacrylate, and any mixtures thereof; and a hydroxy alkyl methacrylate or acrylate, each having 1–8 carbon atoms in the alkyl group; wherein the acrylic polymer has a weight average molecular weight of about 2,000–13,000 and a glass transition temperature of at least 25° C.;
 (ii) 1–50% by weight, based on the total weight of the hydroxyl component, of a hydroxyl-terminated polyester oligomer formed of either oligomerized monomers of caprolactone and a cycloaliphatic polyol; and of oligomerized monomers and a cycloaliphatic anhydride, a linear or branched polyol, and an alkylene oxide; wherein the polyester oligomer has a weight average molecular weight not exceeding about 3,000 and a polydispersity less than about 1.7;

(B) an organic polyisocyanate component comprising about
 (i) 3–50% by weight, based on the total weight of the polyisocyanate component, of a trimer of isophorone diisocyanate;
 (ii) 50–97% by weight, based on the total weight of the polyisocyanate component, of a trimer of hexamethylene diisocyanate;

wherein the ratio of equivalents of isocyanate groups per equivalent of hydroxyl groups in the binder is in the range from about 0.5/1 to 3/1;

wherein the composition further contains:
 (C) a catalyst system for the binder comprising about
  (i) 0.005–0.2% by weight, based on the weight of the binder, of an organotin compound selected from dialkyl tin dicarboxylate,
  (ii) 0.01–1% by weight, based on the weight of the binder, of a tertiary amine selected from the group consisting of trialkyl amines, trialkylene diamines, and any mixtures thereof; and
  (iii) 0.005–1%, based on the weight of the binder, of an organic acid selected from an aliphatic carboxylic acid.

10. The coating composition of claim 9, wherein at least one of the alkyl or alkylene portions of said tertiary amine in said catalyst system contains 6 or more carbon atoms.

11. The coating composition of claim 9, wherein the composition is a two-pack coating comprising in the first pack, components (a) combined with component (c), and in the second pack, component (b), wherein the contents of each pack are mixed together just prior to use.

12. The coating composition of claim 9, wherein the composition is a clear coat for repairing a clearcoat/colorcoat finish.

\* \* \* \* \*